United States Patent [19]

Martin

[11] Patent Number: 4,555,429
[45] Date of Patent: Nov. 26, 1985

[54] CURVED NEEDLEPOINT CANVAS

[75] Inventor: Richard A. Martin, Tarrytown, N.Y.

[73] Assignee: Dick Martin Design, Ltd., Tarrytown, N.Y.

[21] Appl. No.: 622,973

[22] Filed: Jun. 21, 1984

[51] Int. Cl.[4] ............................................. D03D 29/00
[52] U.S. Cl. .................................... 428/131; 428/134; 428/137; 428/906.6; 428/65; 112/439
[58] Field of Search ................... 428/906.6, 131, 134, 428/137; 112/439

[56] References Cited

U.S. PATENT DOCUMENTS

| | | | |
|---|---|---|---|
| 1,418,846 | 6/1922 | Stevens | 428/906.6 X |
| 2,059,653 | 11/1936 | Pretzfelder | 428/131 |
| 3,421,969 | 1/1969 | Roode et al. | 428/906.6 X |
| 3,704,194 | 11/1972 | Harrier | 428/131 X |
| 4,091,925 | 5/1978 | Griffo et al. | 428/134 X |
| 4,404,750 | 9/1983 | Marx et al. | 428/906.6 X |

*Primary Examiner*—George F. Lesmes
*Assistant Examiner*—Nancy A. B. Swisher
*Attorney, Agent, or Firm*—Yuter, Rosen & Dainow

[57] ABSTRACT

A mushroom shaped needlepoint canvas is formed as a hollow curved shell of perforated flexible plastic material, the canvas having a generally oval head part and a tapered stem or body part. This canvas is readily modifiable by shortening the bottom of the body part, attaching limbs as arms and legs, and joining pairs of canvases to form enclosed ellipsoidal shapes atop an enclosed truncated cone base.

18 Claims, 15 Drawing Figures

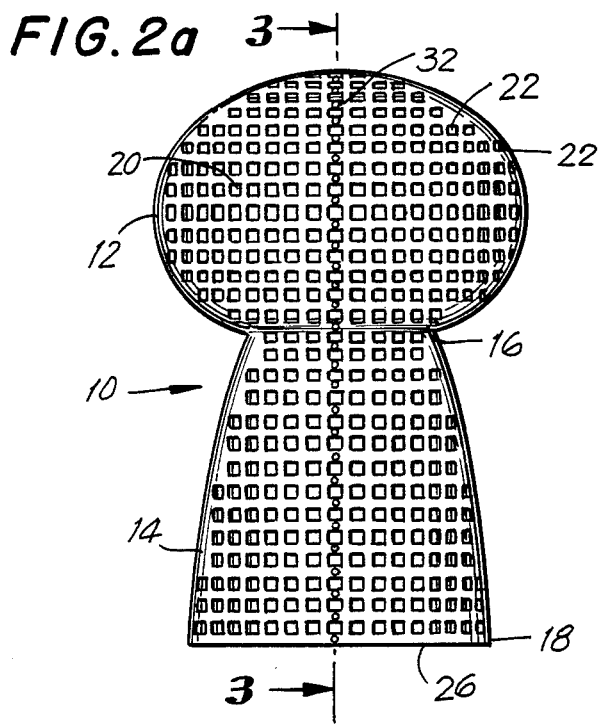
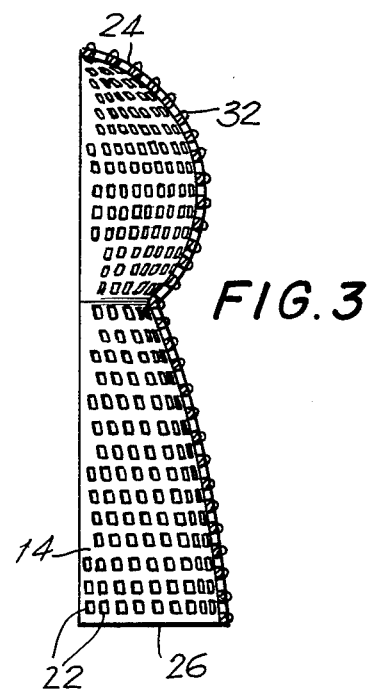
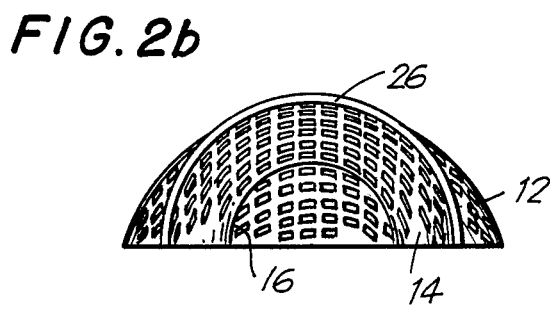
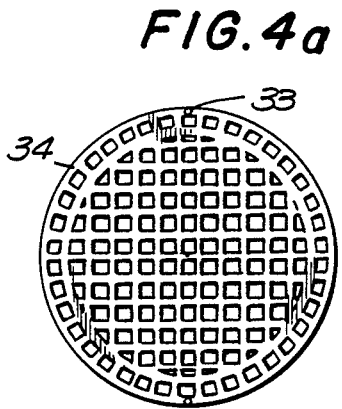
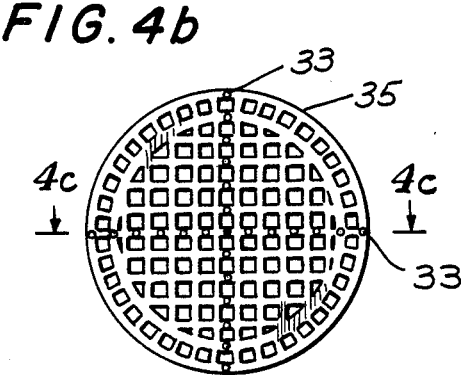

CURVED NEEDLEPOINT CANVAS

BACKGROUND OF THE INVENTION

This invention is in the field of needlepoint devices and techniques and particularly in the field of needlepoint canvas forms in which the yarn is stitched according to designated design patterns. Traditionally and for a great many years needlepoint has been practiced on flat meshes called canvases which are woven on a loom or made of plastic and define a matrix of horizontal lines crossed by vertical lines. The design pattern to be followed by the user is either imprinted directly onto the canvas or is shown on a separate drawing which can be visually transferred by the user as each stitch is made with selected colors of yarn.

A significant development in the needlepoint industry was the introduction of three-dimensional needlepoint objects formed by attaching together individual pieces of flat canvas each of which has its own design requirements. A simple example of such three-dimensional articles would obviously be a cube formed by five or six flat square sections of canvas joined along their adjacent edges. It was discovered that animate objects could also be made by careful selection of the component portions of flat canvas, one example being a frog designed by the inventor of the present invention, and obviously numerous abstract forms could be and were readily conceived in this manner.

The traditional flat canvases and the constructions of portions of flat canvas have the obvious and very significant limitation of not coming even close to any of the curved forms found everywhere in the world including human and animal shapes and the millions of constructions defining symmetrical curves and miscellaneous free forms. The present invention provides a curved canvas form having shape so selected that with the single form a vast variety of results are easily possible for both experienced needlepointers and novices.

SUMMARY OF THE INVENTION

The new invention is a perforated plastic canvas for needlepoint formed as a hollow shell defining half of a mushroom divided by a vertical plane. The mushroom shape includes an oval or ellipsoid head part and a tapered cylindrical body, base, or stem part which extends from the bottom of the head part. The top and bottom of the stem define semicircular, the top being smaller because the stem is tapered and both ends have diameter smaller than the breadth or width of the headpoint ellipsoid which extends along its major axis in a generally horizontal direction.

A pair of these bisected mushroom forms secured together along the plane of the section would produce a three dimensional mushroom comprising an ellipsoid shape atop an enclosed cylindrical shape. The two shells are joined along their symmetrical edges after the needlepoint work is completed in the perforations of each shell. By one alternative the head and stem parts of a single form are severed along their junction line for subsequent use alone or recombined with similar severed parts to produce individual enclosed ellipsoids and tapered cylinder forms.

The basic shape of a single bisected mushroom form has diverse and unexpected versatility. In a slightly abstract sense this form with appropriate needlepoint design and with the addition of legs, arms, ears and/or hats as required can produce shapes that are creative and esthetic, including male and female dolls, an owl, a frog, a rabbit, and a great variety of other real and imaginary forms. The base, as noted earlier, is slightly tapered, narrowing toward the top. This base can readily represent a female child's skirt which can be easily shortened to affect age and style by simply cutting around the circumference of the lower edge or hem.

A pair of stem parts can obviously be joined to produce a three dimensional truncated cone which serves as a basket for the above described enclosed ellipsoid egg or other object. If the combined form remains but the lower portion of the body part is cut away to shorten same, one can easily develop an owl with the addition of eyes.

Another element to be added to the basic mushroom shape is a full disk of perforated sheet situated in a horizontal plane relative to the upstanding mushroom, with corresponding perforations for ease of attaching to the upstanding mushroom and having diameter corresponding to that of the base at whatever elevation it engaged the base.

Whether a pair of symmetrical combined forms are joined or not, the result from the front view still has the appearance of a three-dimensional object having natural curves. The attachment of second head and torso form to the first merely provides 360° symmetry.

Preferably this compound curved mushroom shaped canvas is injection molded as opposed to being pressed from an originally flat canvas. The advantage of being injection molded is that all the peripheral edges can be smooth whereas a pressed form from a flat perforated sheet will have high stretch areas in those parts which are most greatly curved and will have ragged edges along the flat plane in the back which are the result of cutting the excess material where the curvature stops. An injection molded canvas has the additional advantage of having uniform perforations since drawing and stretching a flat perforated canvas would result in great distortion of some perforations. Plastic canvas has the additional advantage of maintaining its shape, requiring no blocking and allowing for a great variety of new stitching techniques.

On the other hand, the costs of manufacturing by pressing flat canvas is significantly less than costs of injection molding. The edge problem can be compensated by appropriate die cutting to eliminate sharp edges. The new form is made preferably from polypropylene, or any other plastics and materials having similar characteristics can be selected. All peripheral edges are finished to provide smooth surfaces for ease of stitching and use. A centered vertical line of perforations is provided extending from the top of the head part down to the bottom of the body part with a raised dot between each to adjacent perforations to establish a center reference line for the convenience of the needlepointer who can count stitches laterally therefrom.

An additional objective with the new invention is to provide a single form which has the enormous versatility so that the users have opportunities for vast creativity and possibilities of original designs. The fact that only one single form is required for all these needlepoint possibilities, allows the manufacturer great economies of volume and the possibility of a reduced cost to the consumer.

Specific features of the preferred embodiments of this invention will now be described in detail with reference to the drawings appended hereto.

BRIEF DESCRIPTION OF THE DRAWINGS

FIG. 2a is a front elevation view of FIG. 1;

FIG. 2b is a bottom plan view thereof;

FIG. 3 is a sectional view taken along line 3—3 of FIG. 1;

FIG. 4a is a bottom plan view of a base disc for the needlepoint form;

FIG. 4b is a bottom plan view of an intermediate disc;

FIG. 4c is a sectional view taken along line 4c—4c of FIG. 4b;

DETAILED DESCRIPTION OF THE PREFERRED EMBODIMENT

Figure 1A:
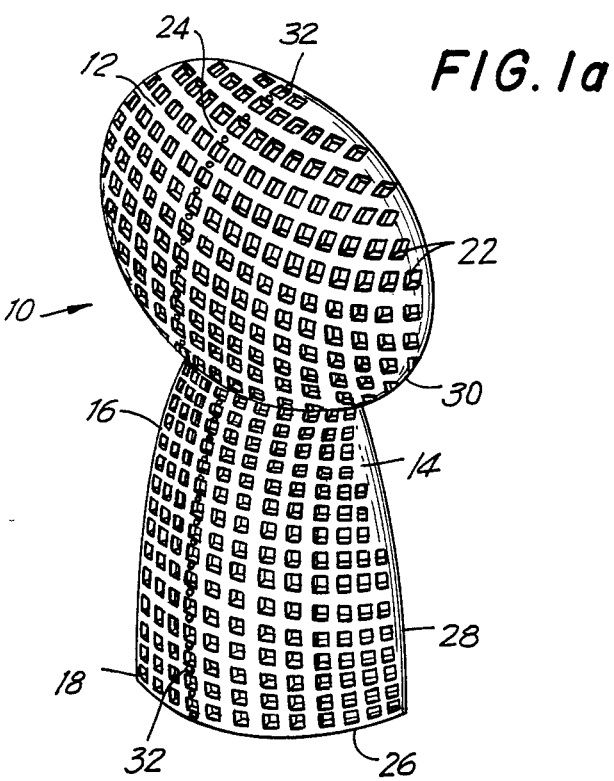
FIG. 1a is a front perspective view of the new needlepoint canvas or body form.
Figure 1B:
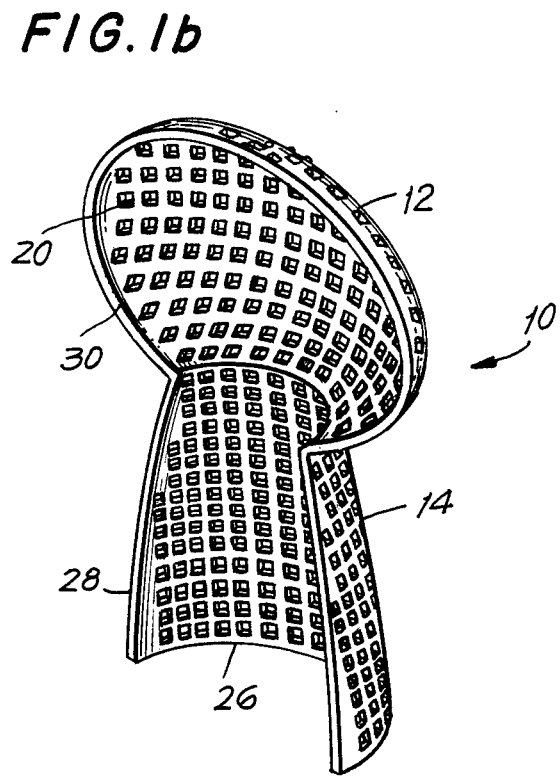
FIG. 1b is a rear perspective view of the body form of FIG. 1.

The new curved needlepoint canvas for a body form 10 is illustrated in front and rear perspective views in FIGS. 1a and 1b respectively and in FIGS. 2 and 3, the form comprising head part 12 which is basically a bisected ellipsoid atop a bisected stem, torso or body part 14 which has a tapered cylindrical shape. This composite form is in effect a set of top and bottom hollow shells made of perforated plastic and made as a single injection molded body form. The plastic is preferably a seven mesh canvas, seven holes per inch, however this characteristic may vary in accordance with desired usage. The form as a whole is mushroom shaped with the head part having greater width or breadth than the torso, and the top edge 16 of the torso 14 being narrower in diameter than the bottom edge 18. This enclosed ellipsoid is defined by the equation $X^2/(1.25)^2 + Y^2/(0.9065)^2 + Z^2/(0.8125)^2 = 1$ where the major axis is $2\frac{1}{2}''$ and the minor axis is 1-13/16". The torso is generated by a 6-27/32" radius arc rotated about a central vertical axis such that there is a bottom diameter of $1\frac{7}{8}''$ and a top diameter of approximately 1-5/16" which defines the junction line with the bottom of the ellipsoid. The height of the ellipsoid or minor axis is 1.8125", and the total height of the mushroom shape is $3\frac{3}{4}''$. The apertures are nominally 3/32" square. These apertures are formed in vertical and horizontal rows 22 with a particular row 24 extending along a central vertical dividing line from top to bottom. The rows of apertures are best shown in FIG. 2. The exposed bottom edge 26, the side edge 28 of the torso 14, and side edge 30 of the head all are smooth to facilitate the needlepoint sewing which will fully and cleanly cover the edge with no jagged or irregular results. To make the center line apertures easier to locate and remember without requiring the user to measure or count apertures, there is provided a series of small projections or posts 32 extending outward from the surface of the canvas and situated between every two adjacent apertures in said centered vertical row of apertures. With these projections it will be easy for the user to orient and position details such as eyes, cheeks, mouth and ears when creating a face for example in the head part 12 of this needlepoint form.

FIG. 4a shows a bottom disc 34 which has diameter the same as the diameter as the bottom edge 18 of the torso 14. It should be apparent if this disc were cut in half to define a semicircle, it would fit exactly at the bottom edge of the torso in a horizontal plane and could easily be sewn thereto because the number of perforations or apertures in the outer circumference of the semicircle is the same as the number of apertures at the bottom edge of the torso. This disc or half disc will serve either to strengthen and stabilize the torso and/or to close the bottom end for esthetic reasons. As seen, the disc is made with apertures located in a grid-like format. A second disc 35 illustrated in FIG. 4b has a smaller diameter, being designed to fit or be attachable to the torso at the elevation of the sixth row of holes from the bottom to produce a shortened body shape. Obviously if a pair of complete body forms as illustrated in FIG. 1a were placed together back-edge to back-edge, i.e. if FIGS. 1a and 1b were placed together like two convex shell halves, the result would be a three dimensional mushroom shape with the top being an enclosed ellipsoid and the bottom being a tapered cylinder. In this situation the element 34 in FIG. 4a would be used in its full disc shape rather than being cut in half. The discs of FIGS. 4a and 4b both have projections 33 as shown to aid the user in locating the center line of the disc. FIG. 4c further illustrates these projections.

Figure 5:
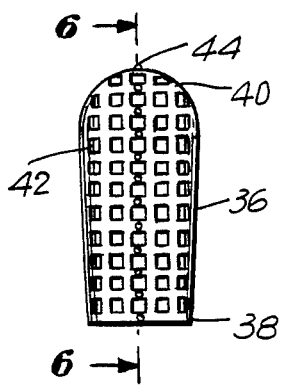
FIG. 5 is a front elevation view of an arm/leg element for the form.
Figure 6:
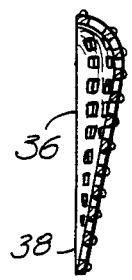
FIG. 6 is a sectional view taken along line 6-6 FIG. 5.
Figure 7:
FIG. 7 is a bottom plan view of the element of FIG. 5.

The next element which is a part of the family of elements which cooperate together in this needlepoint canvas invention is the arm or leg element 36 illustrated in FIG. 5. When this element is used as an arm its upper part 40 becomes a hand or foot and its lower end 38 becomes attached to the body. Similarly, if the element is used as a leg the upper part 40 becomes the foot or ankle and the lower part 38 is attached to the body. This element has similar vertical and horizontal rows of apertures 42 and has a line of projections 44, each projection being between each two adjacent perforations which extend in the central line of projections from the top to the bottom of these elements. These projections serve to help locate the center for the needlepointer at the time of stitching. The dimensions and spacing of these apertures is comparable to that in the basic body form. The elements can also be combined with each other to form a completed or enclosed structural element so as to be a selfcontained representation. Thus, the invention can be used as flat displays, as bas-reliefs or as stand alone enclosed shapes.

Figure 8A:
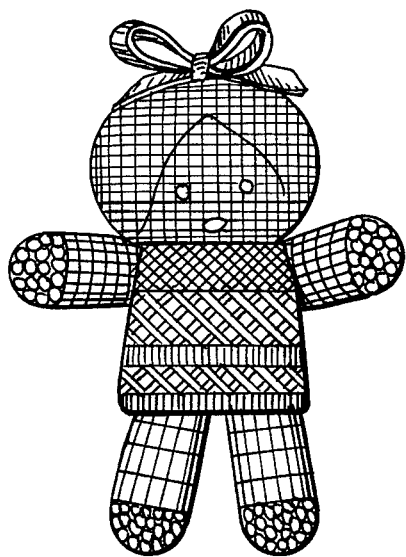
FIGS. 8a-8d are representative samples of various needlepoint forms that can be created from the basic form of FIG. 1.
Figure 8B:
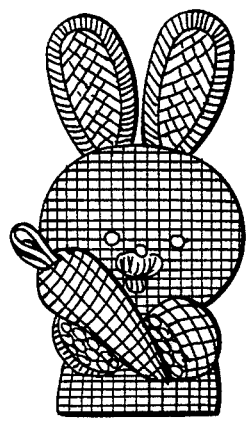
Figure 8C:
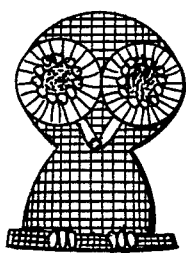
Figure 8D:
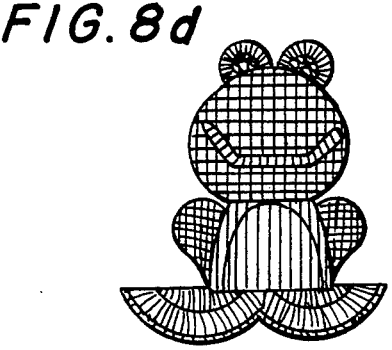

These elements can be combined as limbs in a variety of ways into human, animal and abstract forms. FIG. 8a shows the head and torso unmodified, with arms and legs added to form a female doll shape. FIG. 8b shows the torso cut and shortened, a pair of limbs added as front paws, and a second pair of limbs added as ears. FIG. 8c shows again the shortened torso with large eyes added and tiny feet to form an owl. FIG. 8d shows the shortened torso with eyes placed atop the head to form a frog shape.

When using the basic form of a bisected mushroom shape, the result will have a flat planar back which is easily adapted for a wall plaque. Bisected or enclosed figures are obviously suitable for toys, gifts, Christmas tree ornaments, or other decorative uses. For convenience the invention will be made available in this form with a collection of the above-described parts for the user to make her own selections and combinations. Variations in the specific representations for which the basic form of the invention is employed will be obvious to the skilled artisan.

What is claimed is:

1. A needlepoint canvas comprising a curved perforated plastic sheet having, when in upright orientation, a mushroom shape cut by a central vertical plane, said mushroom shape comprising a generally oval head part whose major axis is horizontal and a generally cylindrical base part having a bottom end diameter less than the horizontal breadth of said head part and a top end diameter less than said bottom end diameter.

2. A canvas according to claim 1 wherein the head part and base parts have central vertical axes that are generally coaxial.

3. A canvas according to claim 1 wherein said base part defines a bisected enclosed ellipsoid.

4. A canvas according to claim 1 wherein said base part defines a bisected generally truncated cone.

5. A canvas according to claim 3 wherein said enclosed ellipsoid is defined by the equation $(X)^2/(1.25)^2 + (Y)^2/(0.9065)^2 + (Z)^2/(0.8125)^2 = 1$.

6. A canvas according to claim 5 wherein said base part is generated by an arc of radius approximately 6-27/32" extending upward and rotated about a vertical central axis forming a circular bottom end of approximately 1⅞" diameter and a circular top end of approximately 1⅜" diameter, the mushroom shape having a total height of approximately 3¾".

7. A canvas according to claim 1 comprising an injection molded article of plastic material.

8. A canvas according to claim 7 wherein said plastic material is polypropylene, 9. A canvas according to claim 1 wherein said perforations define a matrix of horizontal and vertical rows.

10. A canvas according to claim 9 wherein one of said vertical rows of perforations bisects the head and base parts through the center thereof.

11. A canvas according to claim 9 further comprising at least three generally horizontal strips of unperforated material, the first forming a junction between said head and body parts, the second defining a hem along the bottom edge of the body part, and the third situated intermediate said first and second strips.

12. A canvas according to claim 1, wherein said mesh sheet defines apertures therethrough which all have essentially the same shape and size.

13. A canvas form according to claim 12, wherein said apertures are essentially square.

14. A canvas according to claim 13 wherein a typical one of said apertures is at least 1/16" high by 1/16" wide.

15. A pair of canvasses according to claim 14 further comprising a flat perforated disc having a diameter the same as the bottom end diameter of said base part and having perforations where the number and spacing of perforations in the outermost row is the same as the number and spacing of perforations along the bottom edge of said base part.

16. A pair of canvases according to claim 1, which are combinable into a symmetrical form by joining their symmetrical edges, whereby said body parts of said two forms define an enclosed truncated cone and said head parts of said two forms define an enclosed ellipsoid.

17. A canvas according to claim 16 further comprising a pair of limbs of said perforated material, each limb being an elongated shell having opposite first and second ends and defining an outer convex surface, said limbs being attachable to the upper part of said torso as arms or to the lower part of the torso as legs.

18. A pair of head parts according to claim 1 which are combinable into a symmetrical form by joining their symmetrical edges to form an enclosed ellipsoid.

* * * * *